United States Patent [19]

Koller

[11] 4,281,487

[45] Aug. 4, 1981

[54] ENERGY ABSORBING LOAD CARRYING STRUT AND METHOD OF PROVIDING SUCH A STRUT CAPABLE OF WITHSTANDING CYCLICAL LOADS EXCEEDING ITS YIELD STRENGTH

[76] Inventor: Karl S. Koller, 2807 Estates Ave., Pinole, Calif. 94564

[21] Appl. No.: 64,103

[22] Filed: Aug. 6, 1979

[51] Int. Cl.³ .......................... E04B 1/98; E04C 3/30
[52] U.S. Cl. ........................................ 52/167; 52/725; 52/727; 52/731; 52/741; 248/351; 285/114
[58] Field of Search ................. 52/167, 725, 727, 731, 52/741; 285/86, 114; 248/351

[56] References Cited

U.S. PATENT DOCUMENTS

| | | | |
|---|---|---|---|
| 1,971,051 | 8/1934 | Reiner et al. | 52/725 X |
| 3,192,633 | 7/1965 | Pratt | |
| 3,201,076 | 8/1965 | Deleuze | |
| 3,228,646 | 1/1966 | Hinricks et al. | 248/351 X |
| 3,667,405 | 6/1972 | Roach | 52/727 X |
| 3,833,093 | 9/1974 | Robinson | 188/1 C |
| 3,865,418 | 2/1975 | Saxl | 293/89 |
| 3,915,486 | 10/1975 | Maeda et al. | 293/63 |
| 3,972,390 | 8/1976 | Melton et al. | 188/1 |
| 3,979,866 | 9/1976 | Prescott | 52/249 |
| 3,981,114 | 9/1976 | Chupick | 52/232 |
| 3,994,467 | 11/1976 | Pike | 248/356 |
| 4,052,029 | 10/1977 | Townsend | 248/356 |
| 4,071,996 | 2/1978 | Muto | 52/725 X |
| 4,117,637 | 10/1978 | Robinson | 52/167 |
| 4,135,756 | 1/1979 | Hausmann | 52/727 X |

FOREIGN PATENT DOCUMENTS

| | | | |
|---|---|---|---|
| 1141431 | 12/1962 | Fed. Rep. of Germany | 52/730 |
| 2723534 | 12/1978 | Fed. Rep. of Germany | 52/725 |
| 485924 | 3/1972 | Switzerland | 52/725 |
| 519144 | 3/1940 | United Kingdom | 52/727 |

OTHER PUBLICATIONS

Reinforced Concrete Structures, R. Park & T. Paulay, John Wiley & Sons, 1975, pp. 599–600.

Primary Examiner—Alfred C. Perham
Attorney, Agent, or Firm—Naylor, Neal & Uilkema

[57] ABSTRACT

An energy absorbing load carrying strut is provided by laterally restraining a malleable column against eccentric loading bending moments. Lateral restraint is provided by a sleeve extending around the column and, in some embodiments, a rod extending through the column. The sleeve and rod extend over the full length of the column and are so secured as to laterally restrain the column against buckling and not be subject to substantial axial loading as the result of axial loading of the column. The restraint thus provided enables the column to maintain its load carrying capacity while being loaded beyond its yield point.

13 Claims, 15 Drawing Figures

ENERGY ABSORBING LOAD CARRYING STRUT AND METHOD OF PROVIDING SUCH A STRUT CAPABLE OF WITHSTANDING CYCLICAL LOADS EXCEEDING ITS YIELD STRENGTH

BACKGROUND OF THE INVENTION

The present invention relates to a load carrying strut capable of withstanding loads in excess of its yield strength and is particularly concerned with such a strut which may be incorporated into a structure to absorb the energy of extreme cyclical loads, without destruction of the strut or structure. The invention is especially concerned with a strut capable of withstanding, without destruction, the extreme cyclical loads which occur in buildings and other structures during earthquake.

The prior art teaches the use of energy absorbers in structures subject to cyclic earthquake forces. Examples of such absorbers may be found in U.S. Pat. Nos. 3,833,093 and 4,117,637. Both of these patents suggest the use of a plastically deformed material, such as lead, to absorb the cyclic energy imparted to a structure during earthquake conditions. The absorbers of these patents, however, are not in the form of simple and inexpensive struts adapted for incorporation as load bearing members in the manner of the strut of the present invention.

An example of a prior art compression strut having telescoping elements somewhat like those employed in the strut of the present invention may be found in U.S. Pat. No. 4,052,029. In the strut of this patent, however, the compressible medium is crushed and is not suited for cyclic energy absorption thereafter.

Other efforts relating to energy absorbing shock absorbers may be found in the automotive art relating to vehicle structures capable of withstanding crash impacts. These structures, however, generally employ either springs which bounce back, or crushable elements which are not designed for cyclic loading or the maintenance of load carrying capacity after crushing.

SUMMARY OF THE INVENTION

In its broadest aspects, the present invention is concerned with a strut apparatus and method wherein the strut is capable of withstanding cyclical tension and/or compression loads exceeding its yield strength. The primary load carrying member of the strut comprises a malleable column having a bolster secured to either end thereof for imparting tension or compression loads to the column. Bending moment resisting means extend over the length of the column to resist bending moments imparted to the column due to eccentric loading thereof. The bending moment resisting means are so disposed as not to be subject to axial loads imparted to the column.

A principal object of the present invention is to provide an energy absorbing load carrying strut capable of withstanding cyclical tension and/or compression loads exceeding its yield strength.

Another object of the invention is to provide such a strut wherein the load is carried by a column fabricated of a relatively inexpensive material, such as low carbon steel, and the column is so reinforced that it may withstand axial loads in excess of its yield strength, without buckling.

Still another object of the invention is to provide such a strut which may serve as a conduit and may withstand cyclical loads in excess of its yield strength, without rupturing.

Yet another object of the invention is to provide a method and apparatus for reinforcing a column against bending moments imparted thereto as a result of eccentric axial loading.

A further object related to the latter object is to provide such a method and apparatus wherein reinforcement against such bending moments is achieved by confining the column externally, or externally and internally, over its entire length, without subjecting the confining structure to axial loading by the load imparted to the column.

A further and more specific object of the invention is to provide a method and apparatus for reinforcing a column against bending moments imparted thereto due to eccentric axial loading, wherein reinforcement is provided by external, or internal and external, means extending in telescopic relationship to the column in a condition isolated from axial loads carried by the column.

The foregoing and other objects will become more apparent when viewed in light of the accompanying drawings and the following detailed description.

DESCRIPTION OF THE FIRST EMBODIMENT

Figure 1:
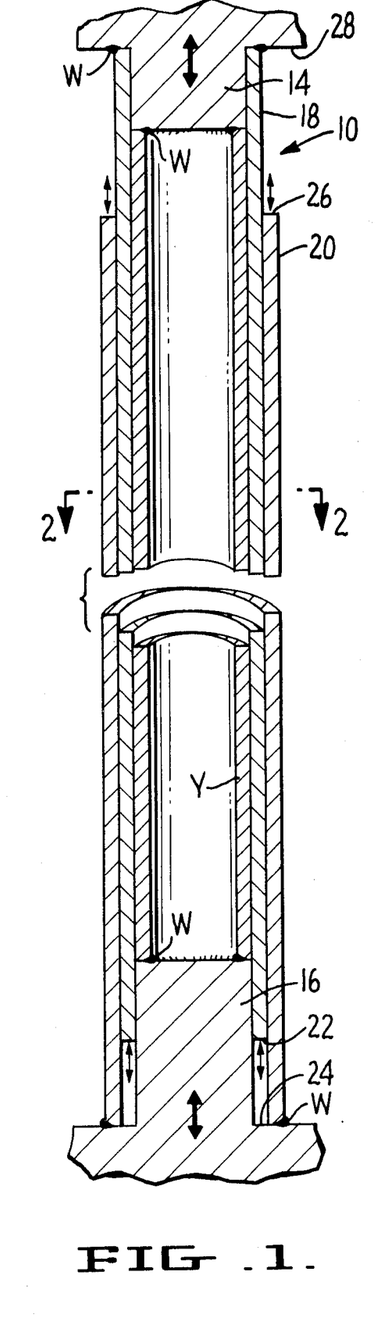
FIG. 1 is an elevational view, in cross-section, illustrating a first embodiment of the strut of the present invention wherein the load carrying column is of tubular cylindrical configuration and the bending moment resisting means comprises sleeves telescopically received around the column.
Figure 2:
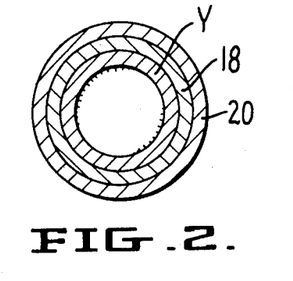
FIG. 2 is a cross-sectional view taken on the plane designated by line 2—2 of FIG. 1.

Referring now to FIGS. 1 and 2, the strut is designated therein in its entirety by the numeral 10 and is shown as comprising the yieldable column Y of tubular, cylindrical configuration axially secured between a pair of end bolsters 14 and 16. The bolsters 14 and 16 are welded to the column Y by welds, designated W, whereby tension or compression forces may be imparted to the column by the bolsters. Bending moment resisting means are telescopically received around the column Y and comprise: a primary sleeve 18 extending around the full length of the column Y in concentric close encircling relationship thereto; and, a secondary sleeve 20 concentrically received around the primary sleeve 18 in close encircling relationship thereto. The sleeve 18 is fixed to the bolster 14 by a weld W and the distal end of the sleeve 18 is slidably received around the bolster 16 so that the end surface of the sleeve, designated 22, is spaced from the opposed end surface of the bolster 16, designated 24. The secondary sleeve 20 is fixed to the bolster 16 by a weld W and has the distal end surface thereof, designated 26, spaced from the opposed end surface, designated 28, of the bolster 14.

The column Y and the bolster 14 and 16 are so constructed that the column will yield in compression or tension prior to yielding or substantial deformation of the bolsters. In one example, the column Y is fabricated of ASTM A53, Grade B steel, and the bolsters are fabricated of ASTM A36 steel. The sleeves 18 and 20 may also be fabricated of ASTM A53, Grade B steel pipe.

It should be appreciated that, as a result of the spacing between the distal ends of the sleeves 18 and 20 and the end surfaces of the bolsters opposed thereto, the sleeves are not subject to substantial axial loading as the result of loads applied to the bolsters. The arrow lines applied to the bolsters in FIG. 1 are intended to depict axial tension and compression loads applied thereto. The small arrow lines at the distal ends of the sleeves 18 and 20 are intended to depict slidable movement of the sleeves relative to the bolsters upon axial loading of the bolsters and the yieldable column Y connected thereto.

The exact dimensions of the strut 10 may vary, depending upon the length and desired strut strength. In a typical example, the strut might have a length of approximately 9 feet between the end surfaces 24 and 28 of the bolsters and the yieldable column Y might be fabricated of two inch Schedule 40 pipe, ASTM A53, Grade B. Such pipe has an I.D. of 2.067 inches and an O.D. of 2.375 inches. The sleeves 18 and 20 might also be fabricated of Schedule 40, ASTM A53, Grade B pipe, chosen so that the I.D. of the sleeve 18 is approximately 0.094 inches greater than the O.D. of the column Y and the I.D. of the sleeve 20 is approximately 0.094 inches greater than the O.D. of the sleeve 18. The length of the sleeve 18 is chosen so that, during all conditions of loading, the sleeve extends over the full length of the column Y, while terminating sufficiently short of the end surface 24 of the bolster 16 so that it will not abut the bolster during compressive loading. Unlike the sleeve 18, it is permissible for the distal end of the sleeve 20 to terminate at such a position that the sleeve 20 does not extend over the full length of the column Y.

The relative inner and outer diameters of the column Y and the reinforcing sleeves 18 and 20 are chosen so that the sleeves will reinforce the column against lateral buckling resulting from eccentric loading of the column. These dimensions should also be such that they will accommodate lateral expansion of the column which may result from compression of the column beyond its yield strength.

DESCRIPTION OF THE SECOND EMBODIMENT

Figure 3:
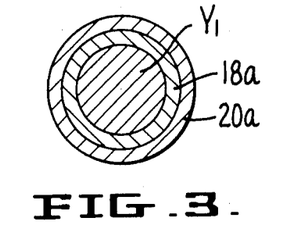
FIG. 3 is a cross-sectional view similar to FIG. 2, illustrating a second embodiment of the strut, wherein the load carrying column is of solid cylindrical configuration and the bending moment resisting means comprises sleeves telescopically received around the column.

The embodiment of FIG. 3 differs from that of FIGS. 1 and 2 primarily in that the yieldable column, designated $Y_1$, is of a solid cylindrical configuration rather than a tubular cylindrical configuration. The primary and secondary sleeves of the FIG. 3 embodiment are designated by the numerals 18a and 20a, respectively. Although not illustrated, it should be understood that the assembly of the elements in the FIG. 3 embodiment would correspond to that shown in FIG. 1 for the first embodiment.

DESCRIPTION OF THE THIRD, FOURTH AND FIFTH EMBODIMENTS

Figure 4:
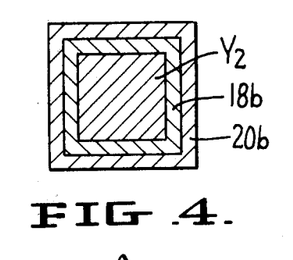
FIG. 4 is a cross-sectional elevational view similar to FIG. 2, illustrating a third embodiment of the strut, wherein the load carrying column is of solid rectangular configuration and the bending moment resisting means comprises rectangular sleeves telescopically received around the column.
Figure 5:
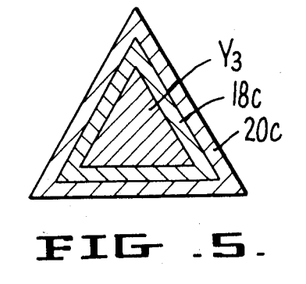
FIG. 5 is a cross-sectional view similar to FIG. 2, illustrating a fourth embodiment of the strut, wherein the load carrying column is of solid triangular configuration and the bending moment resisting means comprises triangular sleeves telescopically received around the column.
Figure 6:
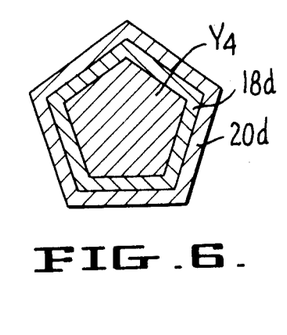
FIG. 6 is a cross-sectional view similar to FIG. 2, illustrating a fifth embodiment of the strut, wherein the load carrying column is of solid pentagonal configuration and the bending moment resisting means comprises pentagonal sleeves telescopically received around the column.

The second, fourth and fifth embodiments, illustrated in FIGS. 4, 5 and 6, respectively, differ from the third embodiment only in that the yieldable column and the primary and secondary reinforcing sleeves therearound are of polygonal, rather than circular, cross-section. As shown in FIG. 4, the column, designated $Y_2$, is of rectangular square configuration and the reinforcing sleeves, designated 18b and 20b are of a similar rectangular square configuration. As shown in FIG. 5, the column, designated $Y_3$, is of an equilateral triangular configuration and the reinforcing sleeves, designated 18c and 20c, of a similar configuration. The column shown in FIG. 6, designated $Y_4$, is of a pentagonal configuration and the reinforcing sleeves therearound, designated 18d and 20d, are of a similar configuration.

The assembly of the third, fourth and fifth embodiments would be the same as that shown in FIG. 1 for the first embodiment.

DESCRIPTION OF THE SIXTH EMBODIMENT

Figure 7:
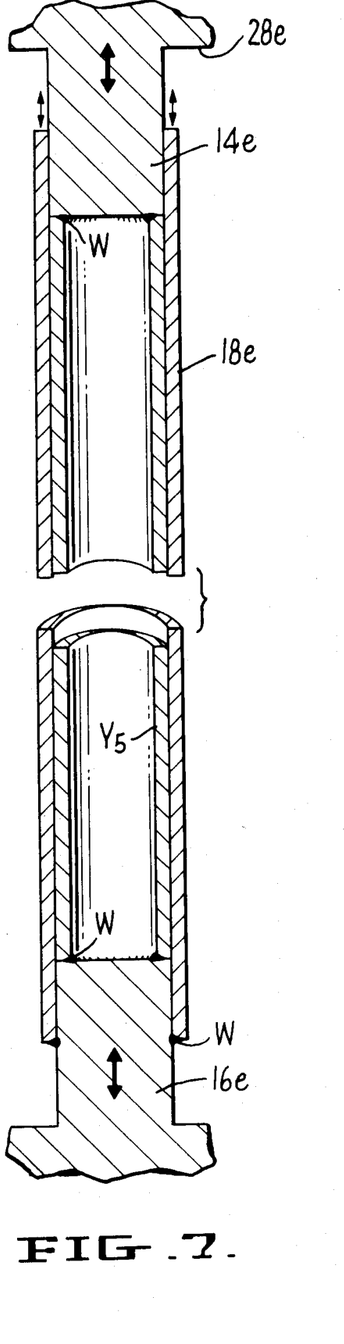
FIG. 7 is an elevational view, in cross-section, illustrating a sixth embodiment of the strut wherein the load carrying column is of tubular cylindrical configuration and the bending moment resisting means comprises a single sleeve telescopically received around the full length of the column.

The sixth embodiment is shown in FIG. 7 and differs from that of the first embodiment primarily in that the bending moment resisting means comprises a single primary sleeve 18e. In the FIG. 7 embodiment, the yieldable column, designated $Y_5$, is of tubular cylindrical configuration similar to the column Y of the FIG. 1 embodiment. The bolsters of the FIG. 7 embodiment are designated by the numerals 14e and 16e and are secured to the column $Y_5$ by welds W. The primary sleeve 18e extends over the full length of the column $Y_5$ and is welded to the bolster 16e by a weld W. The distal end of the sleeve 18e extends slidably around the bolster 14e and is formed with end surface 26e spaced from an end surface 28e of the bolster 14e.

The arrow lines marked on the bolsters 14e and 16e of FIG. 7 depict the direction in which these bolsters move responsive to the application of compression or tension loads thereto. The arrow lines at the distal ends of the sleeve 18e depict movement of the sleeve relative to the bolster 14e responsive to loading of the bolster.

The operation of the FIG. 7 embodiment is essentially the same as that of the FIG. 1 embodiment, as will become more apparent from the subsequent discussion, with the exception that the bending moment resisting means comprises a single primary sleeve 18e, rather than a coupled pair of primary and secondary sleeves, such as the sleeves 18 and 20.

DESCRIPTION OF THE PROTOTYPE EMBODIMENT

Figures 8, 9, 10:
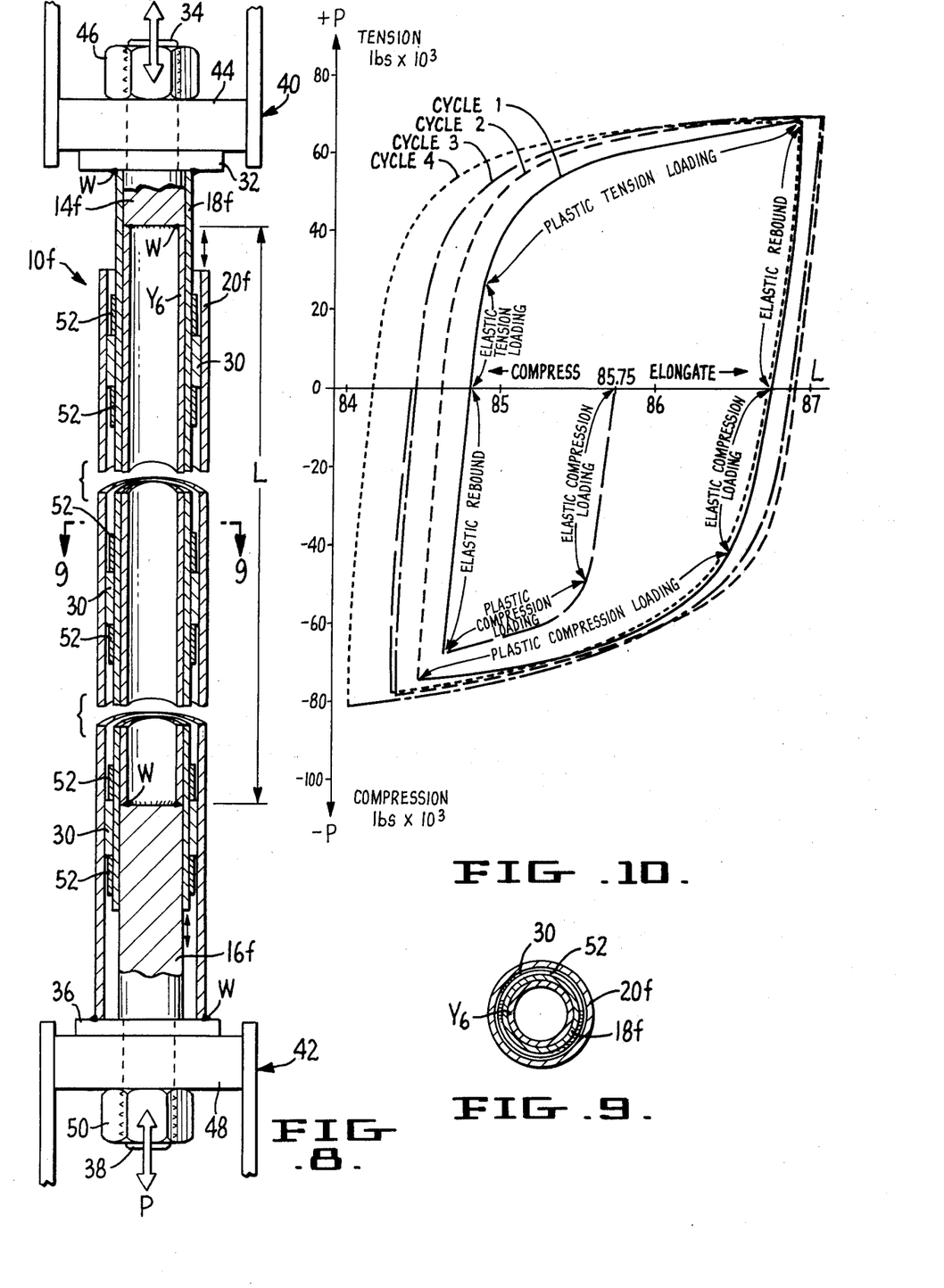
FIG. 8 is an elevational view, in cross-section, illustrating a prototype embodiment of the strut wherein the load carrying column is of tubular cylindrical configuration and the bending moment resisting means comprises sleeves telescopically received around the column, with cylindrical spacers disposed between the sleeves.
FIG. 9 is a cross-sectional view taken on the plane designated by line 9—9 of FIG. 8.
FIG. 10 is a load/length diagram illustrating the results of a test conducted on the prototype strut of FIG. 8.

The prototype strut 10f of FIGS. 8 and 9 differs from the embodiment of FIGS. 1 and 2 primarily in that cylindrical spacers 30 are located between the primary sleeve, designated 18f, and the secondary sleeve, designated 20f. The yieldable column of the prototype embodiment is designated $Y_6$ and is shown secured between bolsters 14f and 16f by weld W. The bolster 14f includes an end plate 32 bearing against a shoulder on the bolster, and a threaded stud 34. The bolster 16f includes an end plate 36 bearing against a shoulder on the bolster, and a threaded stud 38 extending from the bolster.

As shown in FIG. 8, the strut is secured between a pair of loading fixtures, designated 40 and 42, respectively. The stud 34 extends through an opening provided therefor in a plate 44 forming part of the fixture 40. Plate 32 bears against the undersurface of the plate 44 and a nut 46 threadably received on the upper end of the stud 34 bears against the upper surface of the plate 44 to secure the bolster 14f against the separation from the fixture 40. The stud 38 extends through a plate 48 forming part of the fixture 42. The plate 36 bears against one side of the plate 48 and a nut 50 is threadably received on the stud 38 and engaged with the plate 48 to secure the bolster 16f against separation relative to the fixture 42.

The primary sleeve 18f extends over the full length of the column $Y_6$ and is secured in place by a weld W between the proximate end of the sleeve and the plate 32. The distal end of the sleeve 18f is spaced from the plate 36 whereby the sleeve is free to move relative to the bolster 16f, as depicted by the arrow line in FIG. 8. The secondary sleeve 20f is secured in place by a weld W between the proximate end of the sleeve and the plate 36. The distal end of the sleeve 20f is spaced from the plate 32 so that the sleeve may move relative to the plate, as depicted by the arrow line in FIG. 8. The spacers 30 are secured against longitudinal movement relative to the primary sleeve 18f by retaining collars 52. These collars may simply comprise rings of tape adhered to the outside surface of the sleeve 18f. Spacers 30 have an outside diameter slightly less than the inside diameter of the sleeve 20f to accommodate free longitudinal movement of the sleeve relative to the spacers.

The specifications on the prototype embodiment are as follows:

| Element | Specifications |
|---|---|
| $y_6$ | 2 inch Schedule 40 pipe, ASTM A53, Grade B (2.067 inches I.D.; 2.375 inches O.D.), initial length 85¾ inches |
| 14f | 2⅜ inch round bar, ASTM A242, extending 2 inches into the sleeve 18f, machined to 2 inch diameter over the length of the stud 34 |
| 16f | 2⅜ inch round bar, ASTM A242, extending 8 inches into the sleeve 20f, machined to 2 inch diameter over the length of the stud 38 |
| 18f | 2½ inch Schedule 40 pipe, ASTM A53, Grade B (2.469 inches I.D.; 2.875 inches O.D.), length 91⅞ inches |
| 20f | 3½ inch Schedule 40 pipe, ASTM A53, Grade B (3,548 inches I.D.; 4.000 inches O.D.), length 92 92¼inches |
| 30 | 3.44 inches O.D. spacers machined from 3 inch Schedule 40 pipe (3.068 inches I.D.), ASTM A53, Grade B, 2 inches long, spaced from one another by approximately 36 inches |
| 34 & 36 | Steel plate ⅜ inch by 5½ inch square, ASTM A36 |
| 42 & 44 | 2 inch by 7 inch square steel plate, ASTM A36 |
| 46 & 50 | 2 inch heavy hex nut |

FIG. 10 shows a load-length diagram illustrating the results of a test conducted on the prototype of FIGS. 8 and 9. As there shown, the strut was initially progressively subjected to a compressive load of approximately 68,000 lbs. and then run through four cycles of tension and compression loads. The relatively straight line segments at the beginning of the initial compression load and the beginning of each of the successive tension and compression loads illustrate the resilient deformation of the yieldable column which takes places upon initial loading. The curved lines extending from these relatively straight line segments show plastic deformation of the yieldable column. The first cycle is marked to show portions of the diagram which depict elastic loading, plastic loading, and rebound unloading.

From the FIG. 10 diagram, it will be seen that the strut maintains its load-carrying capacity, even when loaded beyond its yield point. Loading beyond the yield point in compression is facilitated by the bending moment resisting means provided by the primary and secondary sleeves. Because of the free condition of the distal ends of these sleeves, they are not subject to substantial axial loading as a result of loading of the strut. The primary and secondary sleeves receive some axial loading due to friction between the column and primary and secondary sleeve walls. This is evidenced by the compression load being higher than the tension load on each loading cycle in FIG. 10. Thus, the sleeves may serve to reinforce the column element against bending moments imparted thereto as the result of eccentric loading. Such reinforcement assures that the column will not buckle when loaded beyond its yield point in compression.

It should be appreciated that the primary retention sleeve extends over the full length of the yieldable column. This, together with the fixed connection between the sleeve and the bolster to one end of the column and the slidable connection between the sleeve and the bolster to the other end of the column, assures that the column will be restrained against buckling.

In the preferred embodiment, the clearance between the column and the primary reinforcing sleeve should be such that the column may not deviate substantially from the straight condition without engaging the sleeve. This is important to assure against buckling of the column in the event of its eccentric loading. The clearance between the primary and secondary sleeves should also be chosen so that the primary sleeve may not deviate substantially from the straight condition without contacting the secondary sleeve. In the prototype embodiment, the spacers 30 are provided to limit the latter clearance, because the standard 2½ inch and 3½ inch Schedule 40 pipes used for the primary and secondary sleeves would allow more clearance than is desirable. In the prototype embodiment, the clearance between the column and the primary sleeve is the difference between the O.D. of the column and the I.D. of the sleeve (i.e., 2.469 inches minus 2.375 inches). This clearance has been found to be very satisfactory for the prototype strut under the tested load conditions. It is anticipated, however, that the clearance might vary, so long as it is maintained sufficiently small to restrain the column against buckling, while sufficiently large to permit relatively substantially unrestricted slidable movement between the respective reinforcing sleeves and the column and the primary reinforcing sleeve.

DESCRIPTION OF THE SEVENTH EMBODIMENT

Figure 11:
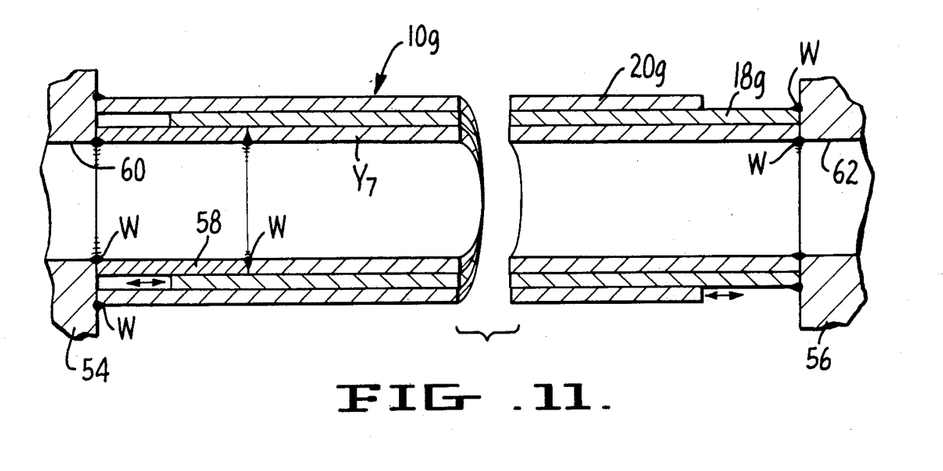
FIG. 11 is a cross-sectional elevational view illustrating a seventh embodiment of the strut, suitable for use as a conduit, wherein the column element of the strut is of tubular cylindrical configuration and the bending moment resisting means comprises a pair of sleeves telescopically received around the column element.
Figure 12:
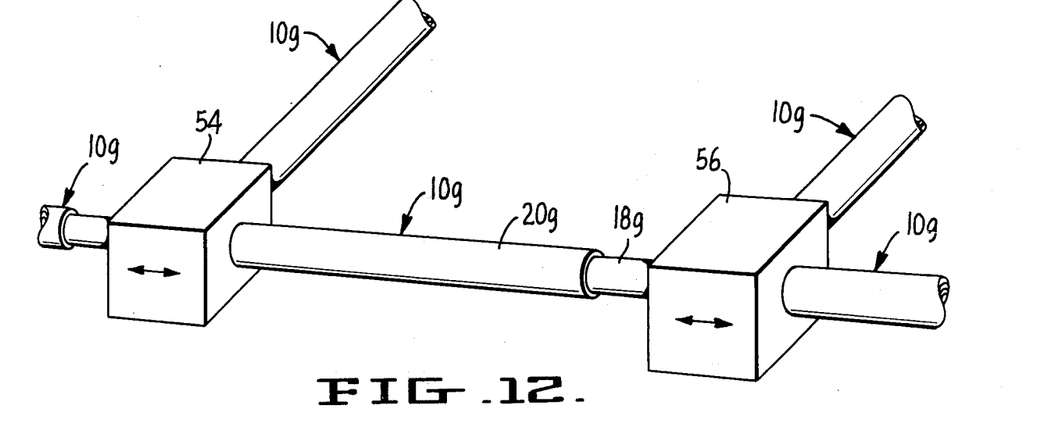
FIG. 12 is a perspective view illustrating the FIG. 11 strut incorporated into a conduit system.

Referring now to FIGS. 11 and 12, the embodiment of the strut shown therein, designated 10g, is designed primarily for use as a fluid conduit. Although this embodiment also has the ability to carry loads under tension or compression, its primary purpose is to provide a conduit which will not rupture or buckle in the event of being subjected to tension or compression forces exceeding its yield strength.

In the embodiment of FIG. 11, the yieldable column, designated $Y_7$, is of cylindrical tubular configuration and confined within primary and secondary sleeves 18g and 20g, respectively. The bolsters of the FIGS. 11 and 12 embodiment take the form of conduit junction blocks 54 and 56 which would typically be anchored to foundations and, thus, subject to relative movement in the event of earthquakes. The block 54 is provided with an incompressible cylindrical extension 58 which is fixed at one end to the block and at the other end to the tubular column $Y_7$. Weld W may be used to secure the fixed connection between the extension 58 and the block and column. The block 56 is welded directly to the column $Y_7$ by a weld W. Passages 60 and 62 within the blocks 54 and 56 provide means whereby fluid may be conducted therethrough and into the conduit provided by the column $Y_7$. As an alternative or in addition to acting as a fluid conduit, the column $Y_7$ may also be used to house electrical conductors. In this event, the conductors should be provided with sufficient slack or cylindrical slip joints to accommodate expansion or contraction in the event of compression or extension of the column $Y_7$ upon earthquake loading.

The sleeve 18g is welded at its proximate end to the block 56 and at its distal end extends slidably over the extension 58 in spaced relationship to the block 54. The sleeve 20g is welded at its proximate end to block 54 and extends slidably around the sleeve 18g so as to have its distal end in spaced relationship to the block 56. Thus, the sleeves 18g and 20g function to reinforce the column $Y_7$ against bending moments in a manner similar to the primary and secondary sleeves of the aforedescribed embodiments.

DESCRIPTION OF THE EIGHTH EMBODIMENT

Figure 13:
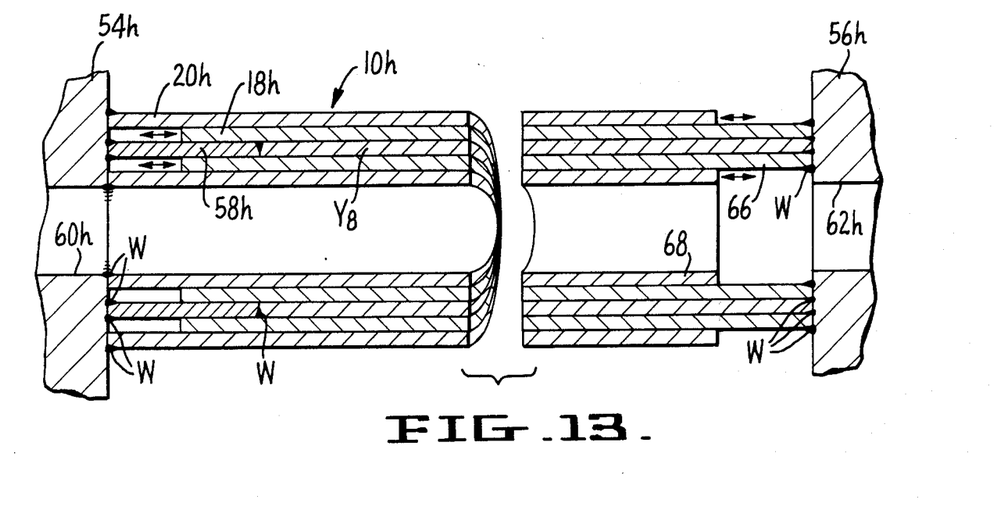
FIG. 13 is a cross-sectional elevational view, illustrating an eighth embodiment of the strut, suitable for use as a conduit, wherein the column element of the strut is of tubular configuration and the bending moment resisting means comprises a first pair of sleeves telescopically received interiorly of the column element and a second pair of sleeves telescopically received around the exterior of the column element.

Referring now to FIG. 13, therein is illustrated another embodiment ideally suited for use as a conduit. The FIG. 13 embodiment differs from that of FIGS. 11 and 12 only in that it is provided with internal reinforcing sleeves, in addition to the external sleeves. The yieldable column of the FIG. 13 embodiment is designated $Y_8$ and the various elements of the embodiment corresponding to those of the FIGS. 11 and 12 embodiment are designated by like numerals, followed by the subscript "h", as follows: strut 10h; primary sleeve 18h; secondary sleeve 20h; junction blocks 54h and 56h; extension 58h and passages 60h and 62h.

The internal reinforcing sleeves of the FIG. 13 embodiment comprise a primary internal sleeve 66 and a secondary internal sleeve 68. The primary sleeve is welded at its proximate end to the bolster 56h and extends over the full length of the column $Y_8$ slidably past the extension 58h to a distal end spaced from the bolster 54h. The secondary internal sleeve 68 is welded at its proximate end to the bolster 54h and extends slidably over the internal surface of the sleeve 66 to a distal end spaced from the bolster 56h. Thus, it will be seen that the primary and secondary internal sleeves reinforce the column $Y_8$ against internal buckling as a result of bending moments in a manner similar to that that the primary and secondary external reinforcing sleeves reinforce the column against external buckling. The resulting structure is extremely buckle resistant.

DESCRIPTION OF THE NINTH EMBODIMENT

Figure 14:
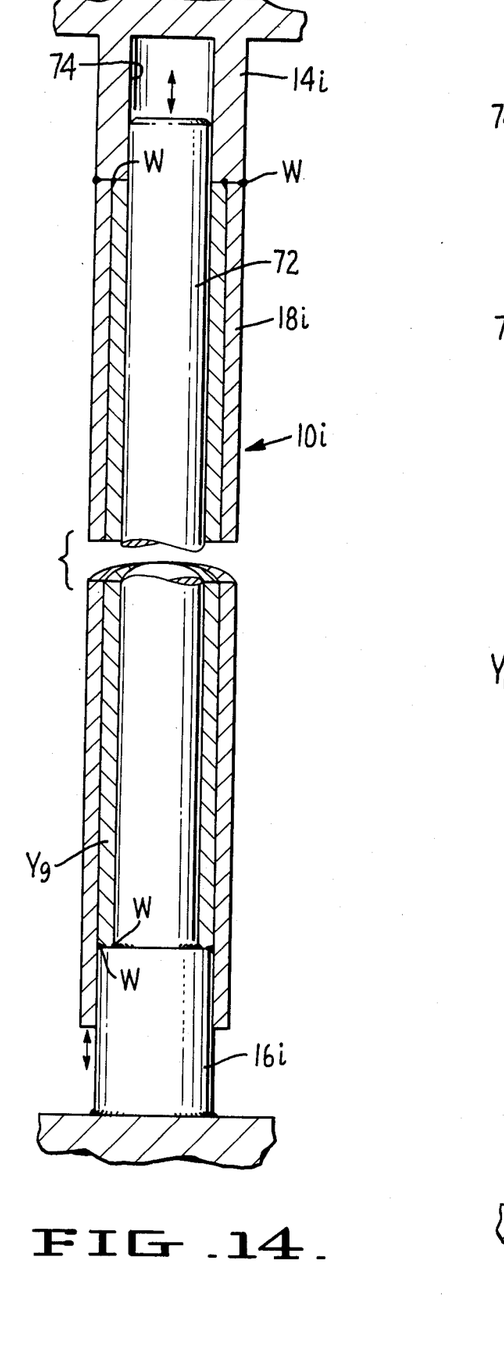
FIG. 14 is an elevational view, in cross-section, illustrating a ninth embodiment of the strut, wherein the load carrying column is of tubular cylindrical configuration and the bending moment resisting means comprises a rod telescopically received interiorly of the column and a sleeve telescopically received exteriorly of the column.

FIG. 14 shows a strut 10i having a yieldable column $Y_9$ reinforced internally and externally by bending moment resisting means extending over the full length of the column. Internal reinforcement is provided by a rod 72 extending through the column $Y_9$ and external reinforcement is provided by a primary sleeve 18a extending around the column. The column $Y_9$ is secured between a pair of load imparting bolsters 14i and 16i welded thereto by welds W so that both tension and compression forces may be imparted to the column. The rod 72 extends slidably through the column $Y_9$ slidably into a cavity 74 provided therefor in the bolster 14i. The distal end of the rod 72 is spaced from the end of the cavity to permit substantially unrestricted movement of the rod relative to the bolster 14i during loading of the column. The primary sleeve 18i is welded to the bolster 14i at weld W and extends at its distal end slidably around the bolster 16i. The distal end of the sleeve 18i is spaced from the end surface of the bolster 16i opposed thereto to permit the sleeve to move freely relative to the bolster during loading of the column $Y_9$.

The strut $10i$ operates in essentially the same manner as that of the aforedescribed embodiments. Yieldable column $Y_9$ is fabricated of a malleable material, such as steel, and operates in essentially the same manner depicted in the diagram of FIG. 10. Rod 72 and sleeve $18i$ laterally restrain the column, while not being subject to substantial axial loads, to reinforce the column against bending moments which may be imparted thereto due to eccentric loading.

DESCRIPTION OF THE TENTH EMBODIMENT

Figure 15:
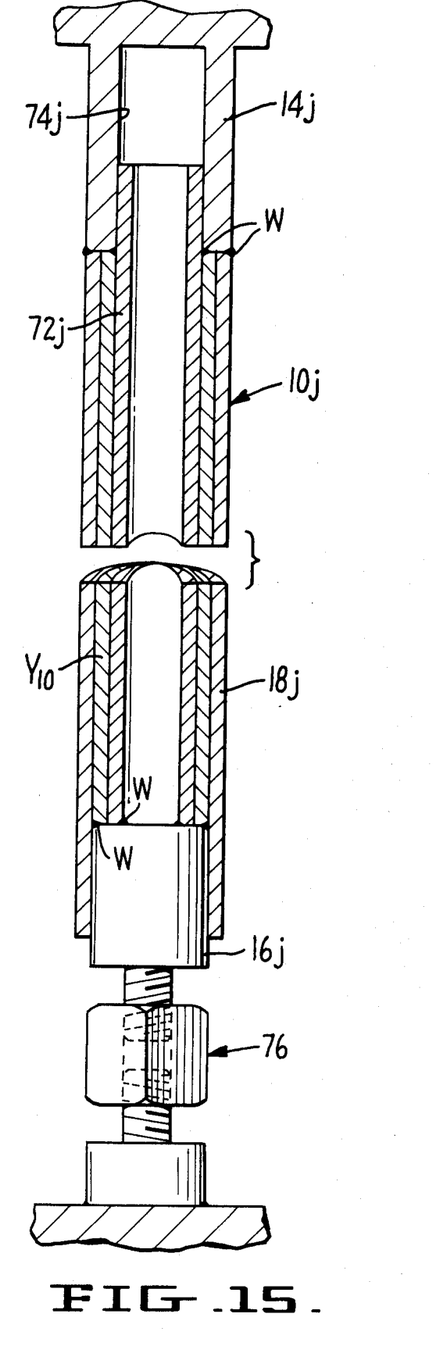
FIG. 15 is an elevational view, in cross-section, illustrating a tenth embodiment of the strut, wherein adjusting means is provided to selectively vary the composite length of the strut and the load carrying column is of tubular configuration and reinforced interiorly and exteriorly by bending moment resisting means comprising sleeves.

The strut of FIG. 15, designated $10j$, is of essentially the same construction as the FIG. 14 strut, with the exception that the internal reinforcing rod $72j$ is tubular and the bolster $16j$ is provided with a turnbuckle mechanism 76 to selectively vary the composite length of the strut. The yieldable column of the FIG. 15 embodiment is designated $Y_{10}$ and is shown captured between a bolster $14j$ and the bolster $15j$. A primary retention sleeve $18j$ extends slidably around the full length of the column $Y_{10}$ from a welded connection with the bolster $14j$ to a slidable disposition relative to the bolster $16j$. The proximate end of the rod $72j$ is welded to the bolster $16j$ and the distal end of the rod extends slidably within a cavity $74j$ formed in the bolster $14j$.

The operation of the FIG. 15 embodiment is essentially the same as the aforedescribed embodiments, and particularly that of FIG. 14. The turnbuckle mechanism 76 enables the length of the strut $10j$ to be selectively varied to adjust the initial length of the strut and readjust the length of the strut, should it be shortened or lengthened as the result of loading of the column $72j$ beyond its yield point. The latter type of adjustment enables a structure within which the strut is incorporated to be restored to original length after loading beyond the yield strength of the column $Y_{10}$, as might occur during an earthquake.

CONCLUSION

While preferred embodiments of the invention have been illustrated and described, it should be understood that the invention is not intended to be limited to the specifics of these embodiments, but rather is defined by the accompanying claims. It should also be appreciated that the operation depicted by the load/length diagram of FIG. 10 is typical of that which could be expected from all embodiments and that the figures set forth in this diagram and the materials and dimensions set forth in the foregoing specification are for purposes of example only.

What is claimed is:

1. An energy absorbing strut capable of withstanding cyclical tension and/or compression loads exceeding its yield strength, said strut comprising: a malleable column, a bolster at either end of the column, said bolsters having a yield strength greater than that of the column and being secured to the ends of the column for imparting tension and compression loads thereto; and bending moment resisting means extending over the full length of the column and past the ends thereof and into engagement with said bolsters to resist bending moments imparted to the column due to eccentric loading thereof and transmit such moments to the bolsters.

2. An energy absorbing strut according to claim 1 wherein the bending moment resisting means is not subject to substantial axial loading by the bolsters during cyclic loading of the strut.

3. An energy absorbing strut according to claim 1 wherein the bending moment resisting means comprises: a primary sleeve extending over the full length of the column in close encircling relationship thereto, said sleeve being engaged with both of said bolsters to transmit bending moments thereto and being freely axially movable relative to at least one of the bolsters.

4. An energy absorbing strut according to claim 3 wherein the bending moment resisting means further comprises a secondary sleeve extending around and in close encircling relationship to the primary sleeve, said secondary sleeve being freely axially movable relative to at least one of the bolsters; and means restraining the secondary sleeve against lateral movement relative to the bolsters.

5. An energy absorbing strut according to claim 4 wherein: the means restraining the primary sleeve against lateral movement comprises a fixed connection between said sleeve and one of the bolsters and a slidable connection between said sleeve and the other of the bolsters; and, the means restraining the secondary sleeve against lateral movement comprises a fixed connection between said sleeve and said other bolster and a slidable connection between said sleeve and said primary sleeve.

6. An energy absorbing strut according to claim 1 wherein the column is tubular and the bending moment resisting means comprises: a rod extending through and over the full length of the column so as to be closely encircled by the column; said rod being freely axially movable relative to at least one of the bolsters; and means restraining the rod against lateral movement relative to the bolsters.

7. An energy absorbing strut according to claim 6 wherein the bending moment resisting means further comprises a sleeve extending over the full length of the column in close encircling relationship thereto, said sleeve being freely axially movable relative to at least one of the bolsters; and means restraining the sleeve against lateral movement relative to the bolsters.

8. An energy absorbing compression strut according to claim 1, further comprising means to selectively vary the composite length of the column and bolsters whereby said length may be adjusted and restored after elongation or compression of the strut as a result of yielding of the column.

9. A conduit capable of withstanding cyclical tension and/or compression loads exceeding its yield strength, said conduit comprising: a malleable tubular member; a bolster at either end of the tubular member, said bolsters having a yield strength greater than that of the member and being secured to the ends of the member for imparting tension and compression loads thereto; and, bending moment resisting means extending over the full length of the member and past the ends thereof into engagement with said bolsters to resist bending moments imparted to the member due to eccentric loading thereof and transmit such moments to the bolsters.

10. A conduit according to claim 9 wherein the bending moment resisting means comprises: at least one primary sleeve extending over the full length of the member in close encircling relationship thereto, said sleeve being engaged with both of said bolsters to transmit bending moments thereto and being freely axially movable relative to at least one of the bolsters.

11. A conduit according to claim 10 wherein the bending moment resisting means further comprises: at least one secondary sleeve extending through and over the full length of the member so as to be closely encircled by the member, said secondary sleeve being axially movable relative to at least one of the bolsters; and means restraining the secondary sleeve against lateral movement relative to the bolsters.

12. A method of providing a load carrying strut capable of withstanding cyclical tension and compression loads in excess of the yield strength of the strut, said method comprising: confining a malleable column over the full length thereof within a sleeve disposed in close encircling relationship to the column; securing the column to load supporting bolsters at either end thereof with the sleeve engaged with the bolsters and disposed for substantially free axial movement relative to at least one of the bolsters whereby the column may be axially compressed or elongated within the confines of the sleeve in response to loading of the bolsters and bending moments imparted to the column due to the eccentric loading thereof are transmitted to the bolsters by the sleeve.

13. A method according to claim 12 wherein the column is tubular, said method further comprising: extending a rod through the full length of the tubular column so that the rod is closely encircled by the column and disposed for substantially free axial movement relative to at least one of the bolsters whereby the column may be axially compressed or elongated relative to the rod in response to loading of the bolsters; and securing the rod against lateral movement relative to the bolsters so that the rod functions to resist bending moments imparted to the column due to eccentric loading thereof.

* * * * *